United States Patent
Schiele et al.

(10) Patent No.: US 10,577,993 B2
(45) Date of Patent: Mar. 3, 2020

(54) DRIVE DEVICE FOR A MOTOR VEHICLE AND METHOD OF OPERATING SUCH A DRIVE DEVICE

(71) Applicant: AUDI AG, Ingolstadt (DE)

(72) Inventors: Marcus Schiele, Etting (DE); Siegfried Meixner, Hofstetten (DE); Mark Banzer, Eichstätt (DE); Gerold Berthold, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 47 days.

(21) Appl. No.: 15/248,936

(22) Filed: Aug. 26, 2016

(65) Prior Publication Data

US 2017/0058736 A1   Mar. 2, 2017

(30) Foreign Application Priority Data

Aug. 29, 2015 (DE) .................. 10 2015 011 409

(51) Int. Cl.
| | |
|---|---|
| *F01N 3/05* | (2006.01) |
| *F01N 3/32* | (2006.01) |
| *F01N 13/10* | (2010.01) |
| *F01N 3/34* | (2006.01) |
| *F02B 75/18* | (2006.01) |

(52) U.S. Cl.
CPC ............... *F01N 3/05* (2013.01); *F01N 3/32* (2013.01); *F01N 3/34* (2013.01); *F01N 13/10* (2013.01); *F01N 13/107* (2013.01); *F02B 75/18* (2013.01); *F01N 2470/30* (2013.01); *F01N 2610/085* (2013.01); *Y02A 50/2322* (2018.01); *Y02T 10/20* (2013.01)

(58) Field of Classification Search
USPC ......... 60/274, 276, 287, 288, 289, 290, 291, 60/292, 293
See application file for complete search history.

(56) References Cited

U.S. PATENT DOCUMENTS 3,927,524 A * 12/1975 Cholvin .................... F01N 3/22
                                                              137/115.11
4,178,755 A * 12/1979 Klimazewski .......... F01N 3/227
                                                                   60/284
(Continued)

FOREIGN PATENT DOCUMENTS

| CH | 534 299 | 4/1973 |
|---|---|---|
| CN | 1898461 | 1/2007 |

(Continued)

OTHER PUBLICATIONS

Chinese Search Report dated May 25, 2018 with respect to counterpart Chinese patent application 2016106747328.

(Continued)

*Primary Examiner* — Binh Q Tran
(74) *Attorney, Agent, or Firm* — Henry M. Feiereisen LLC

(57) ABSTRACT

A drive device for a motor vehicle includes an exhaust pipe and a secondary air device having a first secondary air path which feeds into the exhaust gas pipe. Disposed in the first secondary air path is a secondary air pump and a secondary air valve. To compensate, for example, fluctuations in the supply voltage of the secondary air pump, provision is made for arrangement in the secondary air path of a Laval nozzle which can be placed downstream of the secondary air valve.

14 Claims, 1 Drawing Sheet

(56) References Cited

U.S. PATENT DOCUMENTS

| | | | | |
|---|---|---|---|---|
| 5,050,378 A * | 9/1991 | Clemmens | ............... | F01L 1/08 |
| | | | | 60/312 |
| 5,444,978 A * | 8/1995 | Yoshizaki | ............. | F01N 3/2026 |
| | | | | 60/276 |
| 5,499,502 A * | 3/1996 | Haniu | ..................... | F01N 3/22 |
| | | | | 60/290 |
| 7,140,177 B2 * | 11/2006 | Koyama | .................. | F01N 3/22 |
| | | | | 60/289 |
| 7,805,931 B2 * | 10/2010 | Carlill | .................... | F01N 3/023 |
| | | | | 123/568.11 |
| 8,272,208 B1 * | 9/2012 | Konopacki | ............ | F01N 3/326 |
| | | | | 60/289 |
| 2006/0048504 A1 | 3/2006 | Oi et al. | | |
| 2007/0119433 A1 * | 5/2007 | Popik | ..................... | F01N 1/02 |
| | | | | 123/568.17 |
| 2009/0320466 A1 * | 12/2009 | Vetrovec | ............... | F02B 33/40 |
| | | | | 60/602 |

FOREIGN PATENT DOCUMENTS

| | | |
|---|---|---|
| DE | 1 576 760 | 3/1970 |
| DE | 30 13 445 | 10/1981 |
| DE | 101 00 543 | 5/2002 |
| DE | 102 57 153 | 6/2004 |
| EP | 1 207 280 | 5/2002 |
| EP | 1 319 440 | 6/2003 |
| JP | 2006-283712 | 10/2006 |

OTHER PUBLICATIONS

Translation of Chinese Search Report dated May 25, 2018 with respect to counterpart Chinese patent application 2016106747328.

* cited by examiner

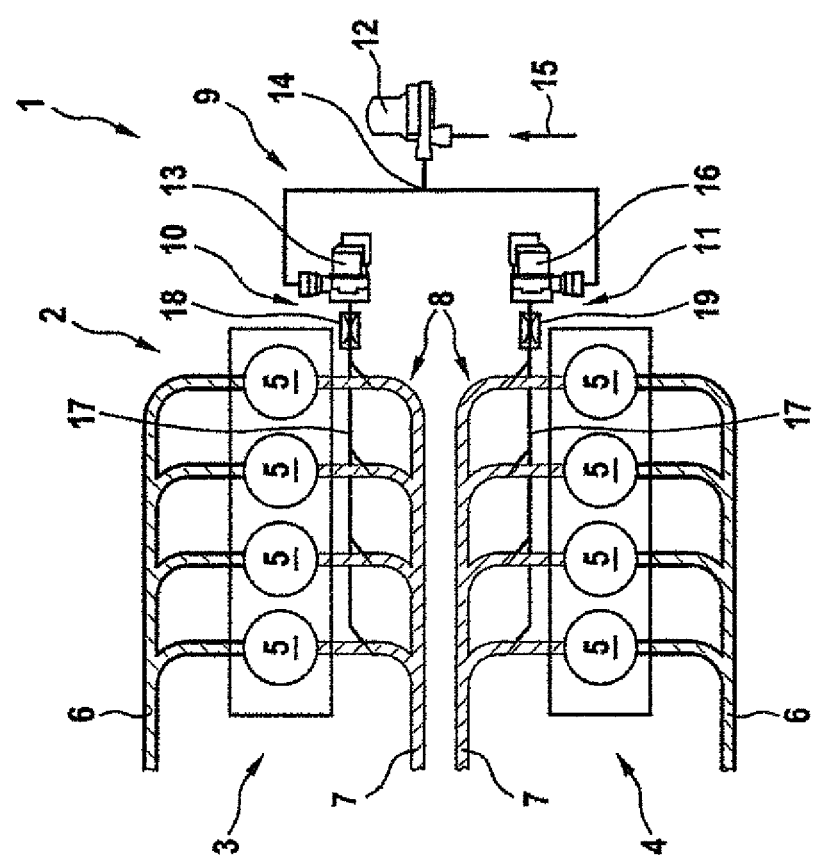

DRIVE DEVICE FOR A MOTOR VEHICLE AND METHOD OF OPERATING SUCH A DRIVE DEVICE

CROSS-REFERENCES TO RELATED APPLICATIONS

This application claims the priority of German Patent Application, Serial No. 10 2015 011 409.3, filed Aug. 29, 2015, pursuant to 35 U.S.C. 119(a)-(d), the disclosure of which is incorporated herein by reference in its entirety as if fully set forth herein.

BACKGROUND OF THE INVENTION

The present invention relates to a drive device for a motor vehicle and to a method of operating such a drive device.

The following discussion of related art is provided to assist the reader in understanding the advantages of the invention, and is not to be construed as an admission that this related art is prior art to this invention.

A drive device is used to propel a motor vehicle, i.e. to provide a torque for propelling the motor vehicle. The drive device includes a secondary air device to provide secondary air for injection into an exhaust pipe. The exhaust pipe carries away exhaust generated by the drive device, in particular an internal combustion engine of the drive device. Secondary air involves fresh air, i.e. air, drawn from the ambient environment and injected chemically unaltered into the exhaust pipe. Injection of secondary air into the exhaust increases the oxygen content of exhaust to thereby enable oxidation of possibly unburned fuel in the exhaust. As a result, unburned fuel is prevented from being released together with exhaust into the environment.

A secondary air path is provided to supply secondary air to the exhaust pipe. Secondary air flows along the secondary air path when need be. The secondary air path normally extends from an intake device, by which air is drawn from the outside environment of the drive device, to the exhaust pipe. The intake device, by which secondary air reaches the secondary air path, can include an air filter. A secondary air pump to convey secondary air in the direction of the exhaust pipe and a secondary air valve are provided in the secondary air path, with the secondary air valve selectively closing or, at least partially, in particular fully, opening the secondary air path. The secondary air valve has two switching states. In one state, the secondary air path is fully closed by the secondary air valve, and in the other state, the secondary air path is completely open. The secondary air valve is also provided to adjust a particular secondary air mass flow rate through the secondary air path.

The secondary air mass flow rate along the secondary air path depends on the secondary air pump which is normally electrically operated. When the supply voltage of the secondary air pump changes, e.g. as a result of unavoidable voltage fluctuations of an on-board electrical system of the motor vehicle, the secondary air mass flow can deviate from a predefined desired mass flow.

It would therefore be desirable and advantageous to provide an improved drive device for a motor vehicle to obviate prior art shortcomings and to realize a constant secondary air mass flow within a broad operating range for supply of secondary air to the exhaust pipe.

SUMMARY OF THE INVENTION

According to one aspect of the present invention, a drive device for a motor vehicle includes an exhaust pipe, a secondary air device having a first secondary air path which feeds into the exhaust pipe, a secondary air pump disposed in the first secondary air path, a secondary air valve disposed in the first secondary air path, and at least one Laval nozzle formed in the first secondary air path.

As a result of the provision of the Laval nozzle in the secondary air path, secondary air has to pass the Laval nozzle before being introduced into the exhaust pipe, i.e. secondary air flows through the Laval nozzle. A Laval nozzle represents a flow member which, viewed in flow direction of secondary air, has a convergent and subsequently a divergent course of the throughflow cross section. Secondary air flows into the Laval nozzle via a first throughflow cross section. The throughflow cross section then narrows continuously in flow direction from the first throughflow cross section in the direction of a second throughflow cross section which is smaller than the first throughflow cross section. The second throughflow cross section represents in flow direction the smallest throughflow cross section of the Laval nozzle. The throughflow cross section of the Laval nozzle increases from the second throughflow cross section up to a third throughflow cross section, from where secondary air exits the Laval nozzle.

The throughflow cross section of the Laval nozzle may be circular in throughflow direction so that compressive strokes inside the Laval nozzle can be prevented. The Laval nozzle can have a longitudinal center axis which extends straight, in particular between a first flow position at the site of the first throughflow cross section and a second flow position at the site of the second throughflow cross section as well as between the second throughflow cross section and a third flow position at the site of the third throughflow cross section.

After flowing into the Laval nozzle, the secondary air is accelerated downstream of the first flow position due to the convergent course of the throughflow cross section, until reaching the second throughflow cross section, i.e. at the second flow position, suitably their greatest flow velocity within the Laval nozzle. The flow velocity advantageously corresponds to the speed of sound of the secondary air at the environmental conditions at hand, i.e. Mach 1. The Laval nozzle advantageously is configured such that the secondary air is no longer accelerated downstream of the second throughflow cross section and thus the second flow position, but rather is slowed down again. For this purpose, the pressure conditions across the Laval nozzle, i.e. the ratio of pressure at the third flow position to the pressure at the first flow position, are correspondingly selected and adjusted by using the secondary air pump in particular.

Because the secondary air reaches the speed of sound in the second throughflow cross section, the maximum secondary air mass flow rate is defined by the Laval nozzle and depends solely on environmental conditions but no longer or only to a significantly reduced degree, on operating parameters of the secondary air pump. For example, when the supply voltage of the secondary air pump increases as a result of fluctuations of the on-board voltage, the increased output of the secondary air pump does not cause an increase in the secondary air mass flow being injected into the exhaust pipe. Rather the amount of air mass flow being injected into the exhaust pipe is limited upwards by the Laval nozzle.

A particular supply voltage of the secondary air pump can be assigned to the operating point of the secondary air pump, at which the secondary air pump causes across the Laval nozzle pressure conditions established when the speed of sound is reached in the second throughflow cross section and further when the secondary air is slowed down between the second throughflow cross section and the third throughflow cross section. The actual desired supply voltage to be used for operation of the secondary air pump may now be selected greater than this supply voltage, e.g. greater by at least 5%, by at least 10%, by at least 15%, by at least 20%, or by at least 25%. Thus, the presence of the Laval nozzle renders the secondary air mass flow not only immune to an increase in the supply voltage of the secondary air pump during operation of the drive device but also to a slight decrease of the desired supply voltage. As a result, a substantially constant secondary air mass flow can be fed to the exhaust pipe independently on the on-board voltage.

In its convergent part, i.e. from the first flow position to the second flow position, the Laval nozzle has a first flow portion, and in its divergent part, i.e. from the second throughflow cross section to the third throughflow cross section, the Laval nozzle has a second flow portion. For example, the Laval nozzle has a symmetric configuration, so that the length of the first and second flow portions are identical in flow direction. Provision may, of course, also be made for the length of the second flow portion to be greater than the length of the first flow portion, or vice versa. The characteristic of the Laval nozzle can be accurately adjusted through different selection of the lengths of the flow portions.

According to another advantageous feature of the present invention, the Laval nozzle can be arranged in a secondary air line upstream of the secondary air pump or downstream of the secondary air pump. Basically, the Laval nozzle may be arranged at any point in the secondary air path. For example, the Laval nozzle can be placed upstream of the secondary air pump. Currently preferred is a placement of the Laval nozzle downstream of the secondary air pump in the secondary air line. The secondary air line extends, for example, from the secondary air pump to the exhaust pipe, i.e. the secondary air line feeds into the exhaust pipe. The secondary air valve can be disposed in the secondary air line.

According to another advantageous feature of the present invention, the Laval nozzle can be integrated in the secondary air pump or in the secondary air valve. As described above, the Laval nozzle can be arranged upstream or downstream at a distance to the secondary air pump. It is, of course, also possible to unite the Laval nozzle and the secondary air pump in a unitary structure, or to unite the Laval nozzle and the secondary air valve in a unitary structure.

According to another advantageous feature of the present invention, the Laval nozzle can be arranged in a line connection device, e.g. a quick-action coupling. The line connection device is provided to connect the secondary air line, the secondary air valve, the exhaust pipe, or a further secondary air line. Integration of the Laval nozzle in such a line connection device is characterized by a particularly flexible handling and simple installation of the secondary air device.

According to another advantageous feature of the present invention, the Laval nozzle can be disposed in a secondary air channel which is formed in a cylinder head of an internal combustion. As described above, the drive device can have an internal combustion engine which includes the cylinder head to demarcate cylinders or combustion chambers of the internal combustion engine in at least one direction. The secondary air channel is formed in the cylinder head and represents a part of the secondary air path.

For example, the cylinder head can have at least one exhaust channel which is part of the exhaust pipe. The exhaust pipe, in turn, may be part of an exhaust manifold which is integrated in the cylinder head. Advantageously, each cylinder of the internal combustion engine has associated thereto an exhaust channel which is formed in the cylinder head and via which exhaust produced in the cylinder or combustion chamber is discharged. The secondary air channel can feed into the exhaust channel. Currently preferred is a construction in which the secondary air channel feeds into several such exhaust channels, advantageously formed all in the cylinder head.

Provision of several secondary air channels in the cylinder head is, of course, also an option, with the secondary air channels being part of the secondary air path. For example, associated to each of the secondary air channels is a Laval nozzle, as described above. The Laval nozzle may, however, also be arranged upwards of the secondary air channels. Each of the secondary air channels feeds advantageously into one or more exhaust channels.

According to another advantageous feature of the present invention, the secondary air device can include a second secondary air path branching off the first secondary air path downstream of the secondary air pump and provided in the exhaust pipe or a further exhaust pipe, with a further secondary air valve being disposed in the second secondary air path. Such a configuration has proved advantageous in particular when the internal combustion engine includes several cylinder banks. The first secondary air path may hereby be associated to one of the cylinder banks and the second secondary air path may hereby be associated to another one of the cylinder banks. Advantageously, the first and second secondary air paths are configured to extend at least in some regions, with the afore-described secondary air channel being formed in the respective cylinder head.

The first and second secondary air paths may also be provided in the same cylinder head and feed into the same exhaust pipe or exhaust manifold. When the internal combustion engine includes several cylinder banks, it is advantageous to associate a separate exhaust pipe to each cylinder bank, with each of the exhaust pipes being associated to a secondary air path. In this case, the first and second secondary air paths are associated to the exhaust pipes, respectively. Suitably, a secondary air valve is disposed in each of the first and second secondary air paths.

According to another advantageous feature of the present invention, a further Laval nozzle can be formed in the second secondary air path. Thus, each of the first and second secondary air paths includes its own Laval nozzle. In this way, the secondary air mass flow rate in both secondary air paths can be reliably limited or kept constant.

According to another advantageous feature of the present invention, one of the exhaust pipes can be associated to one of the first and second cylinder banks, and another one of the exhaust pipes can be associated to the other one of the first and second cylinder banks.

According to another advantageous feature of the present invention, a secondary air mass flow flowing through the Laval nozzle and/or the further Laval nozzle corresponds to a choked mass flow of the Laval nozzle and/or the further Laval nozzle during normal operation of the drive device, in particular the secondary air pump. The term "choked mass flow" of a Laval nozzle relates to a secondary air mass flow that can flow at a maximum through the Laval nozzle. As soon as the secondary air mass flow reaches the choked mass flow, the speed of sound has been realized in the second throughflow cross section, so that the Laval nozzle chokes or blocks and the secondary air mass flow can no longer be increased.

The drive device may hereby be configured such that a choking of the Laval nozzle is effected already during normal operation of the drive device, i.e. the secondary air mass flow corresponds to the choked mass flow. This can be realized, for example, through respective selection of the secondary air pump or through respective selection of the supply voltage of the secondary air pump. The Laval nozzle can be best suited to the drive device so that its choked mass flow corresponds to the secondary air mass flow required by the drive device.

According to another advantageous feature of the present invention, the secondary air device can be configured such that the secondary air mass flow corresponds to the choked mass flow, even when an actual supply voltage of the secondary air pump deviates from a desired supply voltage. The term "deviation" relates hereby in particular to a deviation of the actual supply voltage upwards, i.e. when the actual supply voltage exceeds the desired supply voltage. The desired supply voltage can be selected such that the secondary air mass flow corresponds to the choked mass flow, as soon as the secondary air pump is fed with the desired supply voltage. This may be the case, when the desired supply voltage is the lowest supply voltage. Currently preferred is however, when the desired supply voltage is higher, as described above. In this case, the deviation may also involve a deviation downwards, which can also be substantially compensated.

According to another aspect of the present invention, a method of operating a drive device for a motor vehicle includes conducting a flow of secondary air through a Laval nozzle in a secondary air path before entering an exhaust pipe to compensate fluctuation in a supply voltage of a secondary air pump in the secondary air path. The advantages of the presence of a Laval nozzle has been described above.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic illustration of a drive device for a motor vehicle in accordance with the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to FIG. 1, there is shown a schematic illustration of a drive device according to the present invention, generally designated by reference numeral 1, for use in a motor vehicle. The drive device 1 includes an internal combustion engine 2, which has, by way of example, two cylinder banks 3, 4. It is to be understood that the principles described in the following description with respect to an internal combustion engine having two cylinder banks are generally applicable to an internal combustion engine having only a single cylinder bank for example.

Each of the cylinder banks 3, 4 includes several cylinders 5 which can be supplied via fresh gas lines 6 with fresh gas, e.g. fresh air or a mixture of fresh air and exhaust gas. During operation of the internal combustion engine 2, exhaust is produced inside the cylinders 5 which is carried away via exhaust pipes 7. The exhaust pipes 7 may be part of exhaust manifolds 8, with each of the cylinder banks 3, 4 being operatively connected to such an exhaust manifold 8. The exhaust manifolds 8 can be integrated, at least in part, in cylinder heads of the cylinder banks 3, 4, respectively.

The drive device 1 includes a secondary air device 9, by which secondary air can be introduced into the exhaust of the internal combustion engine 2. For this purpose, the secondary air device 9 has a secondary air path 10 which is associated to the cylinder bank 3. A further secondary air path 11 is associated to the cylinder bank 4. The secondary air path 10 includes a secondary air pump 12 and a secondary air valve 13. The secondary air path 11 branches off the secondary air path 10 downstream of the secondary air pump 12, e.g. at branch point 14. Using the secondary air pump 12, air, e.g. fresh air, can be drawn in, as indicated by arrow 15. The secondary air pump 12 conveys air in the direction of the secondary air valve 13, i.e. initially in the direction of branch point 14. A further secondary air valve 16 is provided in terms of flow in parallel relation to the secondary air valve 13 and arranged in the secondary air path 11.

The secondary air valves 13, 16 can each be constructed as a proportional valve, or, as an alternative, as discretely switching valve.

Provided downstream of the secondary air valve 13 and secondary air valve 16 are respective secondary air channels 17 which are integrated, at least in part, in the cylinder heads of the cylinder banks 3, 4, respectively, and form part of the secondary air paths 10, 11, respectively. Of course, the secondary air paths 10, 11 may also be configured completely outside of the cylinder heads and sized to stretch up to the exhaust lines 7 or exhaust manifolds 8.

To compensate, for example, fluctuations in the supply voltage of the secondary air pump 12, provision is made for arrangement of a Laval nozzle 18 in the secondary air path 10 and/or a Laval nozzle 19 in the secondary air path 11. For example, the Laval nozzle 18 is arranged downstream of the secondary air valve 13, and the Laval nozzle 19 is arranged downstream of the secondary air valve 16. Other dispositions of the Laval nozzles 18, 19 are, of course, also conceivable.

The Laval nozzles 18, 19 can be configured such that their choked mass flow corresponds to the secondary air mass flow, which should be introduced at a maximum into the exhaust that flows in the exhaust pipes 7. Advantageously, the secondary air pump 12 is adjusted such as to generate across the Laval nozzles 18, 19 a pressure ratio which is slightly greater than the pressure ratio, at which the Laval nozzles 18, 19 choke. In this way, fluctuations of the supply voltage of the secondary air pump 12 and thus of the pressure ratio across the respective Laval nozzles 18, 19 can be compensated downwards.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive device for a motor vehicle, comprising:
an exhaust pipe;
a secondary air device having a first secondary air path which feeds into the exhaust pipe;
a secondary air pump disposed in the first secondary air path;
a secondary air valve disposed hi the first secondary air path; and
at least one Laval nozzle formed in the first secondary air path,
wherein the at least one Laval nozzle conducts a flow of air solely through the first secondary air path.

2. The drive device of claim 1, wherein the first secondary air path has a secondary air line, said Laval nozzle being arranged in a secondary air line upstream of the secondary air pump or downstream of the secondary air pump.

3. The drive device of claim 1, wherein the Laval nozzle is integrated in the secondary air pump or in the secondary air valve.

4. The drive device of claim 2, further comprising a fine connection device provided in the secondary air line, said Laval nozzle being arranged in the line connection device.

5. The drive device of claim 4, wherein the line connection device is a quick-action coupling.

6. The drive device of claim 1, further comprising an internal combustion engine including a cylinder head, said secondary air path including a secondary air channel which is formed in the cylinder head, said Laval nozzle being disposed in the secondary air channel.

7. The drive device of claim 1, wherein the secondary air device includes a second secondary air path branching off the first secondary air path downstream of the secondary air pump and provided in the exhaust pipe or a further exhaust pipe, and further comprising a further secondary air valve disposed in the second secondary air path.

8. The drive device of claim 7, further comprising a further Laval nozzle formed in the second secondary air path.

9. The drive device of claim 7, further comprising an internal combustion having first and second cylinder banks, one of the exhaust pipes being associated to one of the first and second cylinder banks, and the other of the exhaust pipes being associated to the other one of the first and second cylinder banks.

10. The drive device of claim 8, wherein a secondary air mass flow flowing through at least one member selected from the group consisting of the Laval nozzle and the further Laval nozzle corresponds to a choked mass flow of the member during normal operation of the drive device.

11. The drive device of claim 8, wherein a secondary air mass flow flowing through at least one member selected from the group consisting of the Laval nozzle and the further Laval nozzle corresponds to a choked mass flow of the member during normal operation of the secondary air pump.

12. The drive device of claim 10, wherein the secondary air device is configured such that the secondary air mass flow corresponds to the choked mass flow, even when an actual supply voltage of the secondary air pump deviates from a desired supply voltage.

13. A method of operating a drive device for a motor vehicle, comprising conducting a flow of secondary air through a Laval nozzle in a secondary air path before entering an exhaust pipe to compensate fluctuation in a supply voltage of a secondary air pump in the secondary air path, wherein the Laval nozzle conducts the flow of secondary air solely through the secondary air path.

14. The method of claim 13, further comprising configuring the Laval nozzle such that its choked mass flow corresponds to a secondary air mass flow introduced at a maximum into exhaust flowing in the exhaust pipe.

* * * * *